United States Patent Office 3,026,302
Patented Mar. 20, 1962

3,026,302
POLYAMIDES FROM 2,4-BIS-CARBOXYMETHYL-TOLUENE
Denis Coleman, Westmount, Montreal, Quebec, Canada, assignor to Monsanto Canada Limited, Quebec, Quebec, Canada
No Drawing. Filed Aug. 10, 1959, Ser. No. 832,486
7 Claims. (Cl. 260—78)

This invention relates to fiber-forming polyamides having an exceptionally rigid molecular structure and related physical properties including high deformation resistance, high modulus of elasticity, wool-like resilience and crease resistance.

Aliphatic diacids have been condensed with aliphatic diamines to obtain superpolyamides having melting points in the useful fiber-forming temperature range of from 210° C. to 280° C. These polyamides, consisting largely of hydrocarbon chain-segments, have very flexible molecules, and owe their high melting point to strong intermolecular forces. This contrasts with the nature of polyethylene terephthalate (sold in Canada under the trademark "Terylene" and in the United States of America under the trademark "Dacron") where the rigidity of the molecule is responsible for the high melting point, and the cohesive energy per repeat unit is only 1900 calories, compared with 3400 calories for the polyamides. The task of designing a rigid nylon molecule is therefore complicated by having to modify the cohesive energy also, if the melting point of the polyamide is not to be elevated too drastically.

The relationship between the melting point (Tm) of a polymer and the internal cohesion and flexibility of the molecule should be borne in mind.

$$Tm = \frac{\Delta H}{\Delta S}$$

where the heat of melting $\Delta H$ is a measure of the cohesive energy, and $\Delta S$ the entropy factor represents the flexibility. Clearly, the introduction of a phenylene linkage into a polyamide will increase the melting point by decreasing the value of $\Delta S$. If the melting point is to be unaffected then the value of $\Delta H$ must also be decreased proportionately. This has been done in some instances by introducing sidechain methyl groups. For example, the condensation of terephthalic acid with hexamethylenediamine and with 3-methyl-hexamethylenediamines respectively gives polyamides melting at 340° C. (with decomposition) and 274° C. The molecule of this latter has a flexibility approaching that of polyethylene terephthalate, although there are six methylene groups between the benzene rings instead of two, as in the case of polyethylene terephthalate. A similar degree of flexibility has been achieved with the polyamide, M.P. 243° C., made from m-xylylenediamine and adipic acid (United States Patent 2,766,221, dated October 9, 1956, Lum et al.).

Applicant's Development

The applicant has now found that even more rigid crystalline fiber-forming polymers can be made by polymerizing 2,4-bis-(carboxymethyl)-toluene with 2,4-bis-(aminomethyl)-toluene (M.P. 266° C.), 2,4-bis-(carboxymethyl)-toluene with m-xylylenediamine (M.P. 231° C.), or metaphenylene diacetic acid with m-xylylene diamine (M.P. 244° C.), or 2,4-bis-(aminomethyl)-toluene. The preferred polymer is formed by polymerisation of the salt from the 2,4-bis-(carboxymethyl)-toluene and 2,4-bis-(aminomethyl)-toluene which is a highly heat-stable polyamide remarkable structurally for several reasons, as its formula indicates:

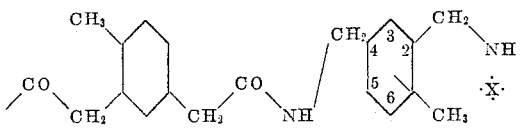

$\cdot \underset{\cdot}{X} \cdot$—The methyl group is in position 1 or 5.

This is the first polyamide discovered containing recurring benzene rings linked in the meta position by —CH$_2$—CO—NH—CH$_2$— links, the benzene nuclei being otherwise unsubstituted or at the most substituted by one methyl group ortho to only one of the links. Said links having in the positions shown above only two methylene groups between the rings ensures an extremely rigid molecule, and further the steric hindrance of the nuclear methyl groups on the free rotation of the chain at the —CH$_2$ bonds increases the rigidity of the molecule still more. This steric effect may be shown by constructing an atomic model of the polyamide repeat unit.

The fact that this polyamide melts within a few degrees of nylon 66 (260° C.) or polyethylene terephthalate (264° C.) has an important practical advantage in that it can be processed on conventional equipment. To obtain the polymer, a nylon salt may be made in the usual way, by neutralizing the diacid with the diamine in water and precipitating the salt by the addition of isopropanol. The salt is then heated for two to six hours at 275° C. at 0.1 to 10.0 mm. Hg pressure, preferably with stirring. The melt crystallizes very readily on cooling, but by rapid quenching it can be obtained in an amorphous, glass-like form. The processing of the fiber resembles that used for polyethylene terephthalate. The drawing process for example must be carried out over a hot pin at 80° C. to 120° C.

The excellent physical, electrical and mechanical properties of films of this polyamide, coupled with outstanding thermal and hydrolytic stability suggest numerous applications. For many electrical uses, the dielectric strength, volume resistivity and surface resistivity make it outstanding for use as an insulator. In non-electrical uses it can be employed as a base for industrial tapes, as a lining material, and as a photographic film base. The fiber form is of particular value in applications where a high heat distortion temperature and a low tenacity/temperature gradient over the range 20° C. to 160° C. is required, for example, as in tire cords. In this type of application the polyamide is superior to nylon in that it is less subject to "creep" under conditions where the load is continuous and heavy.

The polyamide resists several hours boiling in 7 N-hydrochloric acid whereas under the same conditions nylon 66 is dissolved within a few minutes. This resistance to acid hydrolysis is useful in out-of-doors applications especially in industrial areas where a high concentration of sulphuric acid is present in the atmosphere. It is also useful for industrial filter cloths.

2,4-bis-carboxymethyl-toluene may be prepared as follows:

600 parts of 2,4-bis-chloromethyl-toluene in 800 parts of 95% ethanol is added over 35 minutes to a stirred mixture of 400 parts of sodium cyanide and 360 parts of water. The mixture is cooled during the addition and thereafter maintained for a further 4½ hours at refluxing temperature. The solution is cooled, filtered from sodium chloride, concentrated on the steam bath to remove most of the ethanol, diluted with water and extracted into benzene. The extract is distilled, and gives a crude yield (475 parts) of 89.0% of 2,4-bis-cyanomethyl-toluene, B.P. 225° C. to 245° C./15.0 mm. This compound is sufficiently pure for conversion to the diacid. However, it can be further purified by shaking it with 50% sulphuric acid at 60° C. for five minutes, re-extracting into benzene and again distilling. The purified product has a boiling point of 165° C. to 170° C./.06 mm. and a melting point of 43° C.

*Analysis.*—Calculated for $C_{11}H_{10}N_2$: C, 77.65; H, 5.88; N, 16.47. Found: C, 77.73; H, 6.03; N, 16.43.

Ten parts of 2,4-bis-cyanomethyl-toluene is heated to boiling with 100 parts of 70% w./w. sulphuric acid for five minutes and then allowed to cool. The precipitate is separated by filtering the mixture and then dissolved in sodium hydroxide, treated with carbon and again filtered. The acid, after washing, is recrystallized from hot water. The final yield of acid, M.P. 206° C., was 86.0%.

*Analysis.*—Calculated for $C_{11}H_{12}O_4$: C, 63.46; H, 5.71. Found: C, 63.31; H, 5.98.

2,4-Bis-cyanomethyl-toluene may be hydrolyzed to 2,4-bis-aminomethyl-toluene by means of concentrated ammonium hydroxide (5 hrs. at 190° C.). The diamide is filtered off and recrystallized from hot water (M.P. 242° C.).

*Analysis.*—Calcd. for $C_{11}H_{14}N_2O_2$: C, 64.08; H, 6.79; N, 13.58. Found: C, 64.36; H, 6.79; N, 13.39.

The bis-amide is then converted in 91% yield to 2,4-bis-(carbomethoxyaminomethyl)-toluene by means of bromine and sodium methoxide.

*Analysis.*—Calcd. for $C_{13}H_{18}N_2O_4$: C, 58.65; H, 6.77; N, 10.53. Found: C, 58.82; H, 6.73; N, 10.66.

Hydrolysis of this bis-urethane then gives the required diamine, 2,4-bis-(aminomethyl)-toluene. This is described in copending application S.N. 781,207 filed December 18, 1958 by Coleman and Waid.

The invention has been generally described and it will now be considered in further detail by reference to the accompanying examples of preferred procedures.

*Example I*

Sixteen parts of 2,4-bis-(aminomethyl)-toluene were dissolved in 60 parts of water and 20.6 parts of 2,4-bis-(carboxymethyl)-toluene were added. Eighty parts of isopropanol were added to this solution to precipitate the nylon salt, which was separated by filtration and dried in the air chest. The salt (M.P. 151° C.) was transferred to an autoclave and heated to 285° C. under nitrogen. It was maintained at this temperature for 1 hour at atmospheric pressure and then heated for a further 1½ hours at 0.5 mm. The polyamide so obtained was a white, crystalline solid, M.P. 266° C. Filaments were formed from the melt which were readily drawn (X5) at a temperature of 120° C. The fibers thus obtained had an excellent tensile strength and a high elastic modulus, and were exceptionally resistant to the action of boiling 7 N hydrochloric acid.

*Example II* m-Xylylenediamine (17.5 parts) were dissolved in 70 parts of water and 26.4 parts of 2,4-bis-(carboxymethyl)-toluene were added. The solution was mixed with 90 parts of isopropanol and the nylon salt, M.P. 183° C., isolated as before and polymerized. The polyamide was similar to that of Example I, but melted considerably lower at 231° C. and was not quite so resistant to boiling 7 N hydrochloric acid.

*Example III*

Fifteen parts of m-xylylenediamine were dissolved in 65 parts of water and 21 parts of metaphenylene diacetic acid were added. The solution was mixed with 85 parts of isopropanol and the nylon salt, M.P. 195° C., isolated and polymerized as above. The crystalline polyamide was not so acid resistant as the polyamide of Example I, but was considerably more resistant than nylon 65.

I claim:

1. Polymers represented by the recurring unit of the structural formula:

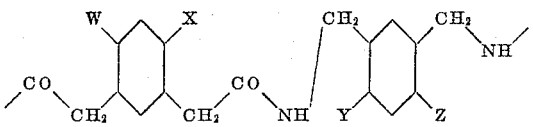

wherein W, X, Y and Z are each one of the group consisting of H and $CH_3$ with a maximum of one methyl group in each ring.

2. The polymer represented by the recurring unit of the structural formula:

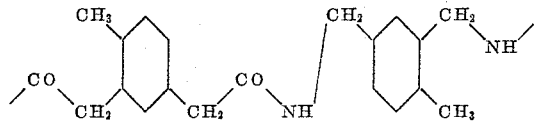

3. The polymer represented by the recurring unit of the structural formula:

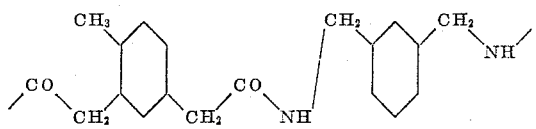

4. The polymer represented by the recurring unit of the structural formula:

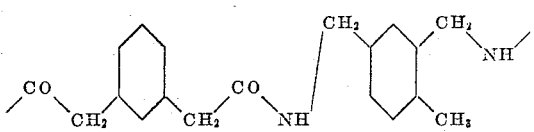

5. The polymer represented by the recurring unit of the structural formula:

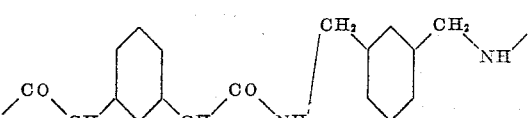

6. Fiber forming polyamides represented by the recurring unit of the structural formula:

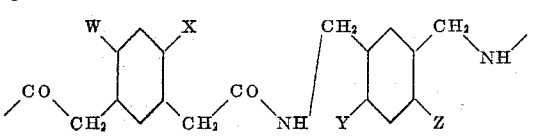

wherein W, X, Y and Z are each one of the group consisting of H and $CH_3$ with a maximum of one methyl group in each ring.

7. The process for making a polymer as defined in claim 1 which comprises polymerizing one of a group consisting of 2,4-bis-(carboxymethyl)-toluene and m-phenylene diacetic acid with one of a group consisting of 2,4-bis-(aminomethyl)-toluene and m-xylylene diamine.

References Cited in the file of this patent
UNITED STATES PATENTS

| | | |
|---|---|---|
| 2,244,192 | Flory | June 3, 1941 |
| 2,766,222 | Lum et al. | Oct. 9, 1956 |
| 2,819,300 | Grosskinsky et al. | Jan. 7, 1958 |
| 2,834,804 | Lecher et al. | May 13, 1958 |
| 2,848,486 | Petropoulos | Aug. 19, 1958 |
| 2,916,476 | Caldwell et al. | Dec. 8, 1959 |
| 2,918,454 | Graham | Dec. 22, 1959 |